US008052514B2

(12) United States Patent
Singer et al.

(10) Patent No.: US 8,052,514 B2
(45) Date of Patent: Nov. 8, 2011

(54) METHOD OF PLAYING A SLOT MACHINE WITH LOCATION DEPENDENT SYMBOL AWARD VALUES

(75) Inventors: Anthony Mark Singer, Ramsey, NJ (US); Tommy Grant Bolling, Mahwah, NJ (US); Daniel Mordecai Marks, Cold Spring, NY (US)

(73) Assignee: PTT LLC, Mahwah, NJ (US)

( * ) Notice: Subject to any disclaimer, the term of this patent is extended or adjusted under 35 U.S.C. 154(b) by 764 days.

(21) Appl. No.: 11/803,061

(22) Filed: May 11, 2007

(65) Prior Publication Data

US 2007/0281777 A1 Dec. 6, 2007

Related U.S. Application Data

(60) Provisional application No. 60/801,665, filed on May 19, 2006.

(51) Int. Cl.
*A63F 9/24* (2006.01)
*A63F 13/00* (2006.01)

(52) U.S. Cl. .............................. 463/20; 463/16; 463/19

(58) Field of Classification Search ............. 463/40–42, 463/9, 16–22, 25–30; 273/143 R, 292, 269
See application file for complete search history.

(56) References Cited

U.S. PATENT DOCUMENTS

| | | | | |
|---|---|---|---|---|
| 6,309,299 | B1 * | 10/2001 | Weiss | 463/20 |
| 6,439,993 | B1 * | 8/2002 | O'Halloran | 463/16 |
| 6,604,999 | B2 * | 8/2003 | Ainsworth | 463/20 |
| 6,910,962 | B2 * | 6/2005 | Marks et al. | 463/16 |
| 7,357,713 | B2 * | 4/2008 | Marks et al. | 463/16 |
| 7,686,686 | B2 | 3/2010 | Marks et al. | |
| 2003/0073480 | A1 | 4/2003 | Thomas et al. | |
| 2003/0114215 | A1 | 6/2003 | Adams et al. | |
| 2003/0157981 | A1 * | 8/2003 | Marks et al. | 463/20 |
| 2004/0023708 | A1 * | 2/2004 | Kaminkow et al. | 463/16 |
| 2004/0048646 | A1 | 3/2004 | Visocnik | |
| 2005/0148381 | A1 * | 7/2005 | Marks et al. | 463/16 |
| 2006/0089191 | A1 * | 4/2006 | Singer et al. | 463/20 |
| 2007/0077980 | A1 | 4/2007 | Marks et al. | |

* cited by examiner

*Primary Examiner* — Masud Ahmed
(74) *Attorney, Agent, or Firm* — Holland & Hart, LLP

(57) ABSTRACT

The present invention includes a variety of methods to calculate symbol award values based upon the location of one or more predetermined symbols in the symbol matrix. In a preferred embodiment, the award value for a symbol varies according to the row in which the symbol appears. In another embodiment, the award value for symbols varies according to the relative locations of the symbols to each other in the symbol matrix.

6 Claims, 4 Drawing Sheets

METHOD OF PLAYING A SLOT MACHINE WITH LOCATION DEPENDENT SYMBOL AWARD VALUES

PRIORITY CLAIM

This application is a non-provisional patent application that claims priority to and the benefit of U.S. Provisional Patent Application Ser. No. 60/801,665, filed May 19, 2006, incorporated herein by reference.

COPYRIGHT NOTICE

A portion of the disclosure of this patent document contains or may contain material subject to copyright protection. The copyright owner has no objection to the photocopy reproduction of the patent document or the patent disclosure in exactly the form it appears in the Patent and Trademark Office patent file or records, but otherwise reserves all copyright rights.

FIELD OF INVENTION

In general, the present invention relates to new methods for calculating symbol award values in a slot machine game. More specifically, the present invention relates to scatter symbol award values that depend upon the location of the scatter symbols in the symbol matrix.

BACKGROUND OF THE INVENTION

To play a conventional slot machine, the player deposits money into the machine, sets the wager, and spins the reels. When the reels stop spinning, the player collects credits for winning symbol combinations displayed on the reels, if any, according to a predetermined pay schedule.

While the appearance of conventional slot machines may change from one theme, such as space aliens, to another, such as farm animals, the underlying methods of play—setting the wager, spinning the reels, collecting awards—remain the same from machine to machine.

The many similarities of conventional slot machines frustrate players, casinos, and manufacturers. Players tire of games using the same methods of play; casinos cannot distinguish their games offerings from other casinos; and manufacturers cannot distinguish their products from other manufacturers.

New methods of playing slot machines, therefore, are required to provide players, casinos, and manufacturers with uniquely entertaining slot machine games, including new methods of calculating symbol award values, as taught by the present invention.

SUMMARY DESCRIPTION OF THE INVENTION

The present invention includes a variety of methods to calculate symbol award values based upon the location of the symbols in the symbol matrix.

In a preferred embodiment, the award value for a symbol varies according to the row in which the symbol appears. For example: the award value for a symbol in row 1 starts at X; the award increases value in row 2 from X to Y (Y>X); and the award further increases value in row 3 from Y to Z (Z>Y).

In an alternative embodiment, the award value for a symbol varies according to the column in which the symbol appears. For example: the award value for a symbol in column 1 starts at A; the award increases value in column 2 from A to B (B>A); the award increases value in column 3 from B to C (C>B); the award increases value in column 4 from C to D (D>C); and the award further increases value in column 5 from D to E (E>D).

In another embodiment, the award value for a symbol varies according its location in the symbol matrix and also according to the changing values associated with the locations in the symbol matrix. For example: the award value for a symbol in row 1 starts at X during spin 1; the award value for a symbol in row 1 increases from X to Y (Y>X) during spin 2; and then award value for a symbol in row 1 decreases from Y back to X during spin 3.

In another embodiment, the award values for a first and second symbol vary in different manners according to their locations in the symbol matrix. For example: the award value for the "Red" symbol in row 1 starts at X; the award increases value in row 2 from X to Y (Y>X); and the award further increases value in row 3 from Y to Z (Z>Y). At the same time, the award value for the "Blue" symbol in column 1 starts at A; the award increases value in column 2 from A to B (B>A); the award increases value in column 3 from B to C (C>B); the award increases value in column 4 from C to D (D>C); and the award further increases value in column 5 from D to E (E>D).

In another embodiment, the award for a symbol varies within a range of values according its location in the symbol matrix. For example: the award value for a symbol in row 1 starts at X, where X represents a value range from $X_1$ to $X_2$ ($X_2$>$X_1$); the award increases value in row 2 from X to Y, where Y represent a value range from $Y_1$ to $Y_2$ ($Y_2$>$Y_1$, $Y_1$>$X_1$, and $Y_2$>$X_2$); the award increases value in row 3 from Y to Z, where Z represent a value range from $Z_1$ to $Z_2$ ($Z_2$>$Z_1$, $Z_1$>$Y_1$, and $Z_2$>$Y_2$).

In another embodiment, the award for a symbol varies according to its location in the symbol matrix relative to other symbols. For example: the award value for the "Red" symbol varies according to its distance, as measured by rows, columns, or symbol positions, from the "Blue" symbol. In one variation of this embodiment, the award values increase with greater distance between the symbols; in another variation, the award values increase with less distance between the symbols.

In another embodiment, the award for a symbol varies according to its location in the symbol matrix relative to a non-symbol. For example: the award value for the "Red" symbol varies according to its distance, as measured by rows, columns, or symbol positions, from the "Trigger" symbol. In one variation of this embodiment, the award values increase with greater distance between the symbol and the Trigger symbol; in another variation, the award values increase with less distance between the symbol and the Trigger symbol.

In any of the preferred or alternative embodiments of the present invention, the award values may take the form of credits, cash, coins, electronic funds transfer, free spins, prizes, bonus events, and/or other award values.

BRIEF DESCRIPTION OF THE DRAWINGS

The accompanying figures illustrate various stages of a preferred embodiment of the present invention.

DESCRIPTION OF A PREFERRED EMBODIMENT

Figure 1:
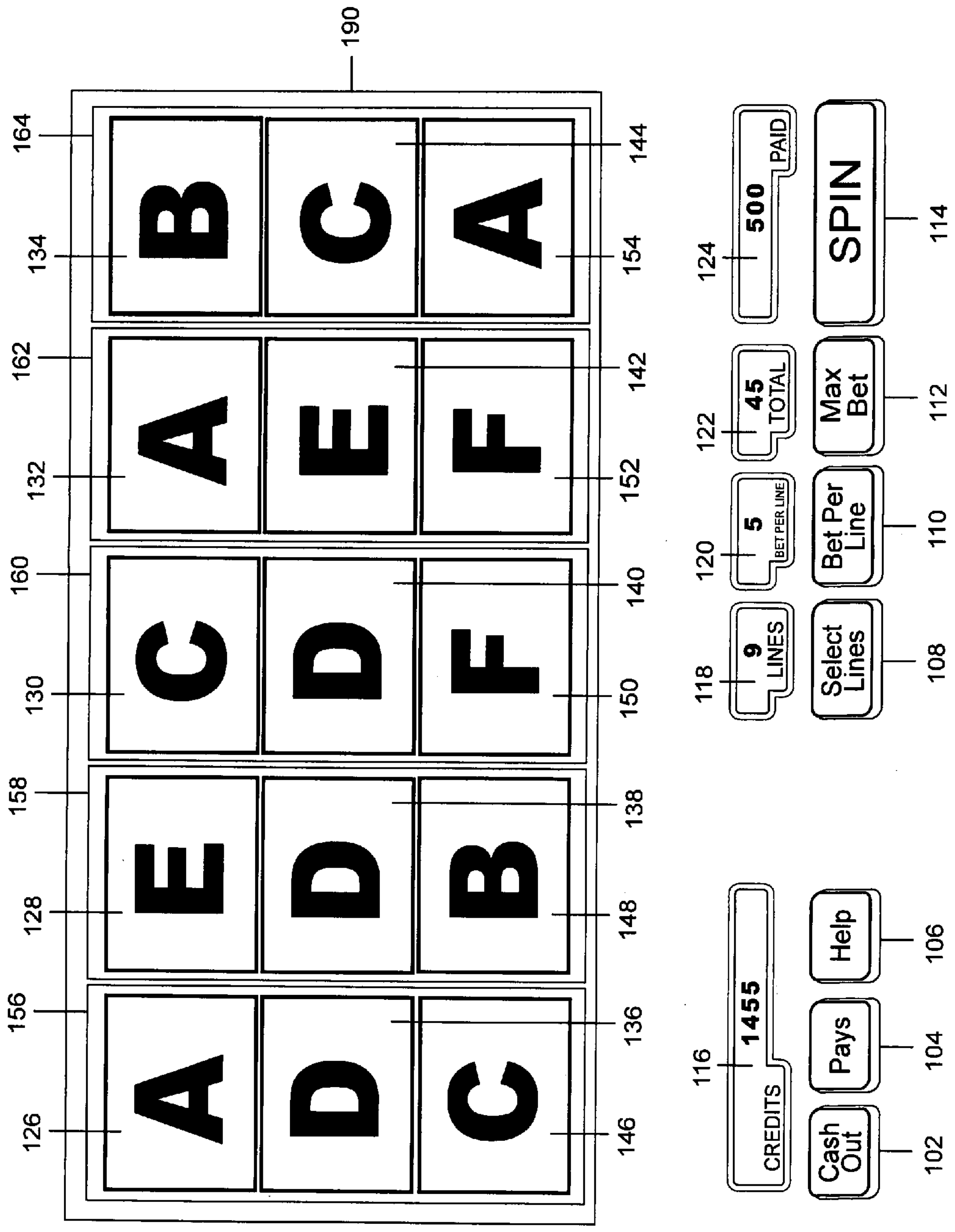
FIG. 1 shows a representative game screen with a "D-D-D" line pay appearing across the middle row of the symbol matrix.

To play a preferred embodiment of the present invention, the player initializes credits, sets the wager, spins the reels, and collects awards for line pays and scatter pays, as detailed below with reference to FIGS. 1 to 4:

Initialize Credits. The player initializes credits by depositing money in the form of coins, gaming tokens or paper currency into a coin head (not shown) or bill acceptor (not shown). Coins and gaming tokens are collected in a reservoir (not shown) inside the gaming machine; paper currency is collected in the bill acceptor (not shown) inside the gaming machine.

If the coins, gaming tokens or paper currency are validated as authentic, the player accrues the appropriate number of playing credits on the Credit meter 116. More credits may be initialized, if necessary, by additional deposits. Alternatively, any method of initializing credits may be used including debit cards, credit cards, smart cards, or other form of electronic funds transfer.

Set the Wager. The player sets the wager by selecting pay lines and setting the bet per pay line. The wager is calculated by multiplying the number of selected pay lines by the bet per pay line. For example, the player places a 5-credit wager on each of the nine available pay lines for a 45-credit total bet. The total bet amount is displayed on the Total Bet meter 122.

To select pay lines, the player uses the Select Pay Lines button 108 and views the number of selected pay lines on the Select Pay Lines meter 118. The player uses the Select Pay Lines button to select pay lines in a predetermined order. For example, the first pay line selected is always pay line 1, second pay line selected is always pay line 2, etc. Alternatively, fewer or greater than nine pay lines may be used with any order of pay line activation.

To set the bet per pay line, the player uses the Bet Per Pay Line button 110 and views the amount bet per pay line on the Bet Per Pay Line meter 120. The same amount is wagered on each pay line. For example, the player may place up to 5-credit wagers on each pay line. Alternatively, wagers of any amount may be placed on a pay line, with the same or different amount wagered on each pay line.

In addition, the player may use the Bet Max button 112 to place the maximum bet per pay line on all pay lines. Alternatively, any wager may be assigned a button.

Spin the Reels. The player uses the Spin button 114 to randomly rearrange the symbols displayed in the symbol matrix 190. The symbol matrix 190 contains three symbol positions for each of the five slot reels 156-164 for a total of fifteen symbol positions 126-154. Alternatively, any number of reels with any number of symbol positions may be used.

The slot reels 156-164 spin and randomly stop one reel at-a-time, from left to right, until all five reels have stopped and all fifteen symbol positions 126-154 of the symbol matrix 190 are revealed. Alternatively, any size symbol matrix may be used and any method may be used to rearrange symbols in the symbol matrix.

Line Pay Awards. The player collects line pay awards based upon the appearance of three or more same symbols in adjacent positions of a payline, starting from the leftmost position of a pay line. The value of all line pay awards are defined in the pay schedule (not shown), with a predetermined award value assigned to each listed line pay.

Alternatively, line pays may be comprised of any number of same or different symbols appearing in any positions of a payline. Further, the pay schedule may define any number of line pays, with any award type and/or amount assigned to each line pay. The player may view the pay schedule by using the Pays button 104.

In FIG. 1, a winning D-D-D symbol combination 136-140 appears on a payline defined across the middle row 136-144 of the symbol matrix 190. The game calculates the value of the D-D-D symbol combination 136-140, without regard to its location in the symbol matrix, by multiplying the combination's 100-credit award, as listed on a predetermined pay schedule (not shown), by the five credits bet per pay line, as set by the Bet Per Pay Line button 110 and displayed on the Bet Per Pay Line meter 120. The resulting 500-credit line pay award is displayed on the Paid meter 124.

Scatter Pay Awards. The player also collects awards based upon the appearance of one or more predetermined symbols "scattered" anywhere in the symbol matrix 190 ("scatter symbols"), with the award value dependent upon the row in which the scatter symbols appear. The value of a scatter symbol award in each of the rows—top 126-134, middle 136-144, and bottom 146-154—is defined in the pay schedule (not shown).

Figure 2:
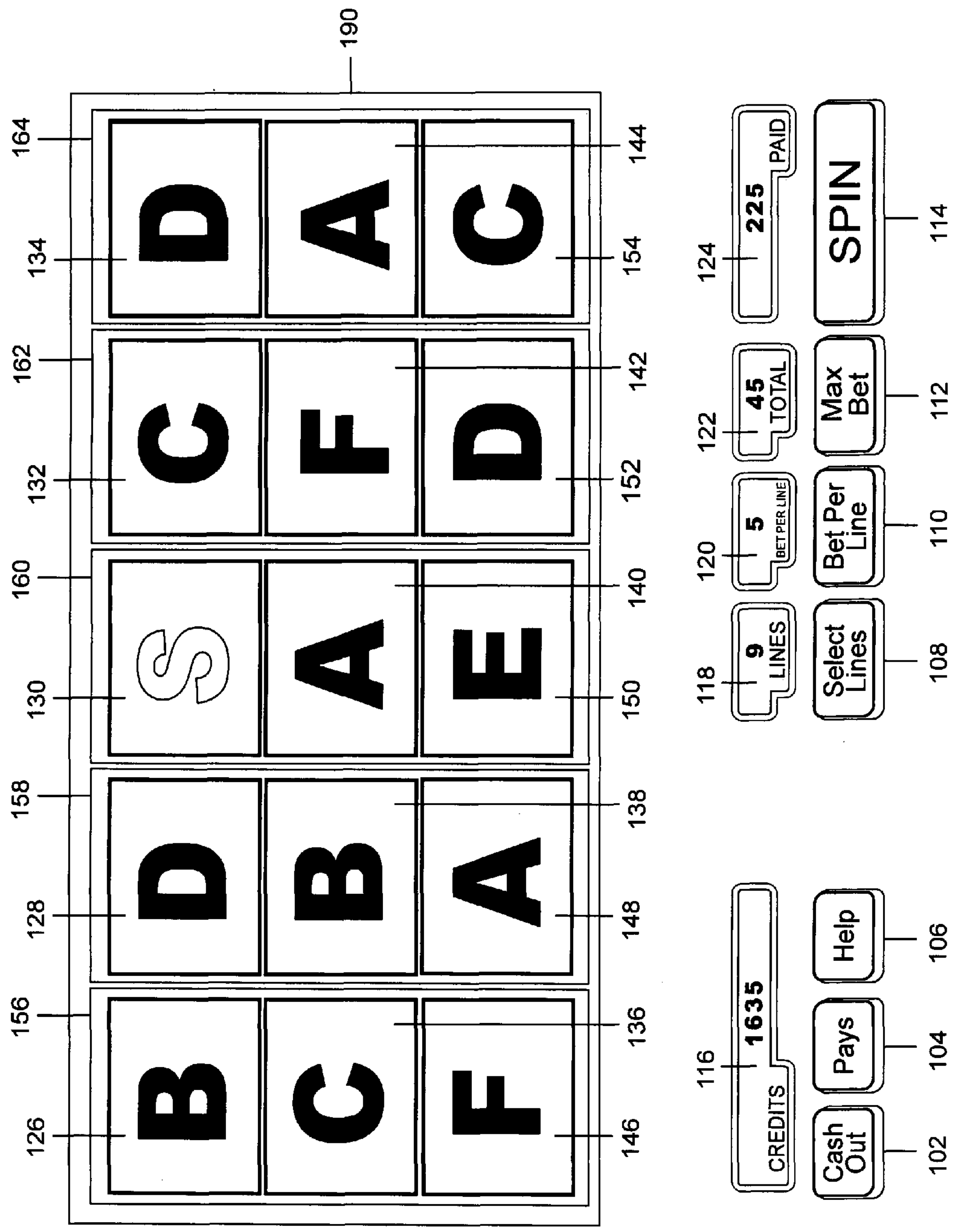
FIG. 2 shows a representative game screen with an "S" symbol appearing in the top row of the symbol matrix.

In FIG. 2, a scatter symbol "S" appears in the first row 126-134 of the symbol matrix 190. The game calculates the value of the "S" scatter symbol 130 by multiplying the 5-credit scatter award value for the first row 126-134, as listed on a predetermined pay schedule (not shown), by the 45-credit total amount bet, as displayed on the Total Bet meter 122. The resulting 225-credit scatter pay award is displayed on the Paid meter 124.

Figure 3:
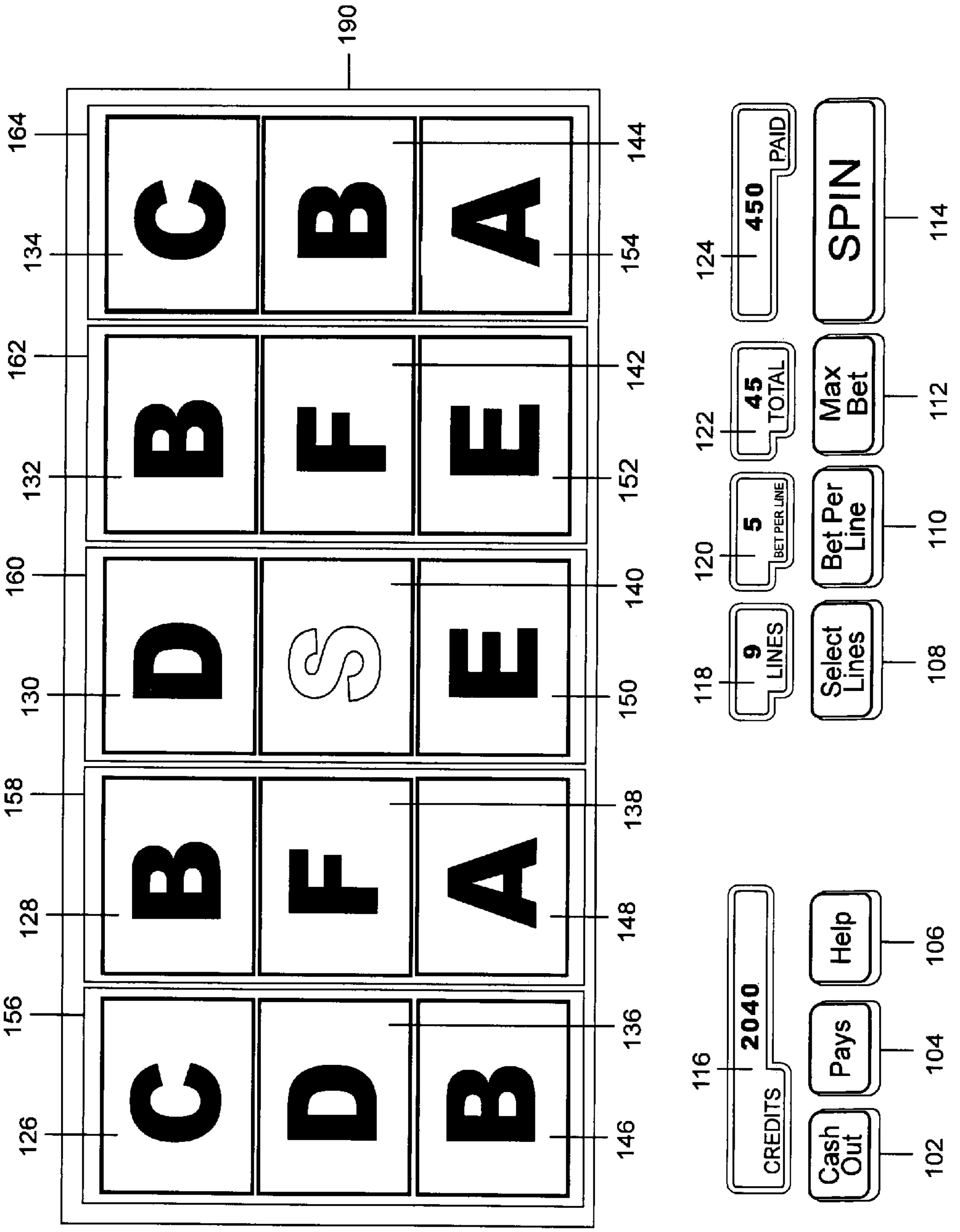
FIG. 3 shows a representative game screen with an "S" symbol appearing in the middle row of the symbol matrix.

In FIG. 3, a scatter symbol "S" appears in the middle row 136-144 of the symbol matrix 190. The game calculates the value of the "S" scatter symbol 140 by multiplying the 10-credit scatter award value for the middle row 136-144, as listed on a predetermined pay schedule (not shown), by the 45-credit total amount bet, as displayed on the Total Bet meter 122. The resulting 450-credit scatter pay award is displayed on the Paid meter 124.

Figure 4:
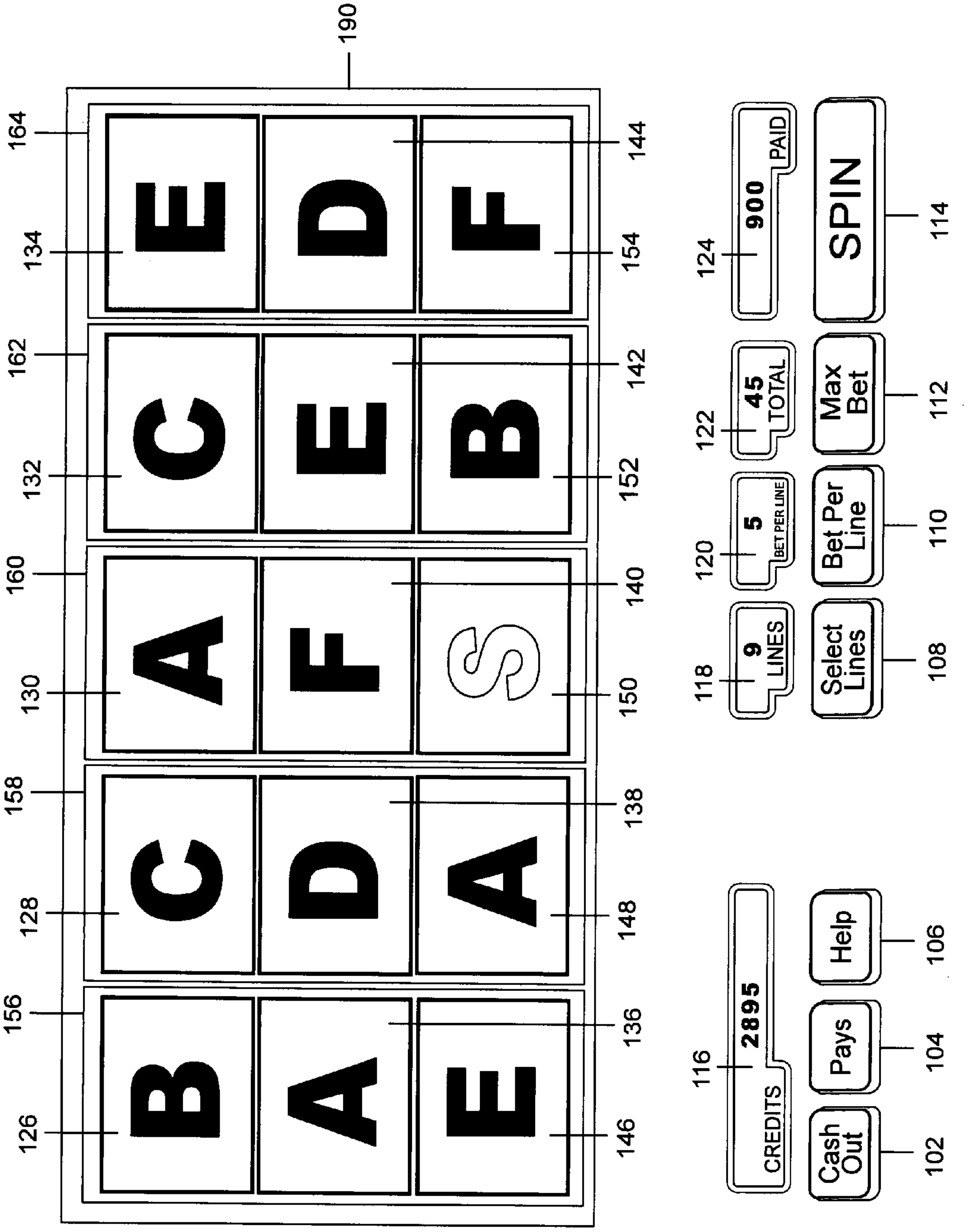
FIG. 4 shows a representative game screen with an "S" symbol appearing in the bottom row of the symbol matrix.

In FIG. 4, a scatter symbol "S" appears in the bottom row 146-154 of the symbol matrix 190. The game calculates the value of the "S" scatter symbol 150 by multiplying the 20-credit scatter award value for the bottom row 146-154, as listed on a predetermined pay schedule (not shown), by the 45-credit total amount bet, as displayed on the Total Bet meter 122. The resulting 900-credit scatter pay award is displayed on the Paid meter 124.

Thus, the location of the scatter symbol in the symbol matrix 190 controls the value of the scatter symbol award, with award increasing from the top row to the middle row and again from the middle row to the bottom row:

In FIG. 2, the scatter symbol appears in the top row 126-134 and results in a lower award, 225 credits, than the scatter symbol appearing in the middle row 136-144, 450-credit award, or bottom row 146-154, 900-credit award;

In FIG. 3, the scatter symbol appears in the middle row 136-144 and results in a higher award, 450-credits, than the scatter symbol appearing in the top row 126-134, 225-credit award, but a lower award that the bottom row 146-154, 900-credit award; and In FIG. 4, the scatter symbol appears in the bottom row 146-154 and results in a higher award, 900-credits, than the scatter symbol appearing in the top row 126-134, 225-credit award, or middle row 136-144, 450-credit award.

Following the calculation of the scatter pay and/or line pay awards, the credit values are added to the player's balance of credits. As long as the player has credits on the Credit meter 116, the player may continue to play the gaming machine or the player may also collect the balance of credits by pressing the Cash Out button 102. In addition, the player may press the Help button 106 to view the rules of the game.

Scope & Spirit of the Present Invention

The many features and advantages of the present invention are apparent from the descriptions of the preferred and alternative embodiments. The present invention, however, is not limited to these particular embodiments, as the invention is capable of being practiced and carried out in various ways. For example, new features may be added to an existing embodiment or features from two or more embodiments may be combined to produce a new embodiment. Further, features mentioned in any embodiment may be interchanged with similar features not mentioned that perform the same or similar functions. And, finally, the phraseology and terminology used to explain the embodiments are only descriptive and should not be regarded as limiting. The claims, therefore, seek to cover all features and advantages that fall within the true spirit and scope of the present invention.

We claim:

1. A method of operating a slot machine of the kind that displays a symbol matrix formed by at least one row intersecting a plurality of columns, a symbol location being defined at each row-column intersection, the rows and columns including a plurality of symbols, one symbol being displayed at each symbol location, the slot machine under control of a processor, the method comprising:

defining in the processor at least one symbol as an award symbol;

selecting in the processor, from among all symbol locations without regard to whether any symbol location has been selected for display of any symbol, at least one first-award symbol location and at least one second-award symbol location for the award symbol;

associating in the processor a first value with the first-award symbol location and a second value with the second-award symbol location, wherein the first value is different than the second value based on the location of the award symbol on the symbol matrix regardless of combinations with other symbols in the symbol matrix;

randomly rearranging in the processor the plurality of symbols;

displaying the rearranged symbols on a display of the slot machine; and under control of the processor, issuing an award having the first value if an award symbol appears in a first-award symbol location without regard to any symbol appearing in any adjacent location and having the second value if an award symbol appears in a second-award symbol location without regard to any symbol appearing in any adjacent location.

2. A method of operating a slot machine of the kind that displays a symbol matrix formed by at least one row intersecting a plurality of columns, the rows and columns including a plurality of symbols, the slot machine under control of a processor, the method comprising:

defining in the processor at least one symbol as an award symbol;

randomly assigning in the processor award values to the rows and columns where the award symbol may be displayed, without regard to whether any symbol location has been selected for display of any symbol, and without regard to appearance of the award symbol in combination with other symbols in the symbol matrix, wherein the assigned award values differ from each other based on the column and row of each assigned award value;

randomly rearranging in the processor the plurality of symbols;

displaying on a display of the slot machine the rearranged symbols; and under control of the processor, issuing an award for appearance of the award symbol anywhere in the symbol matrix, the award having a value determined by the assigned award value of the row and the column in which the award symbol appears, without regard to any symbol adjacent to the award symbol.

3. A method of operating a slot machine of the kind that displays a symbol matrix formed by at least one row intersecting a plurality of columns, the rows and columns including a plurality of symbols, the slot machine under control of a processor, the method comprising:

defining in the processor at least two symbols as award symbols;

randomly rearranging in the processor the plurality of symbols;

displaying on a display of the slot machine the rearranged symbols; and under control of the processor, issuing an award for appearance of two award symbols anywhere in the matrix, the award having a value which changes based on the the locations of the award symbols within the symbol matrix, wherein the value is determined by measuring the relative distance between the two award symbols, without regard to any location of any other symbol, and without the award symbols appearing in combination with other symbols in the symbol matrix.

4. The method of claim 3, in which the distance between the two award symbols is measured by the number of rows separating the two award symbols.

5. The method of claim 3 in which the distance between the two award symbols is measured by the number of columns separating the two award symbols.

6. A method of operating a slot machine of the kind that displays a symbol matrix formed by at least one row intersecting a plurality of columns, the rows and columns including a plurality of symbols, the slot machine under control of a processor, the method comprising:

defining in the processor at least two symbols as award symbols;

randomly rearranging in the processor the plurality of symbols;

displaying on a display of the slot machine the rearranged symbols; and under control of the processor, issuing an award for appearance of two award symbols anywhere in the matrix, the award having a value which changes based on the the locations of the award symbols within the symbol matrix, wherein the value is determined by counting at least one of A) the number of rows separating the two award symbols, and B) the number of columns separating the two award symbols, without regard to any location of any other symbol, and without the award symbols appearing in combination with other symbols in the symbol matrix.

* * * * *